UNITED STATES PATENT OFFICE.

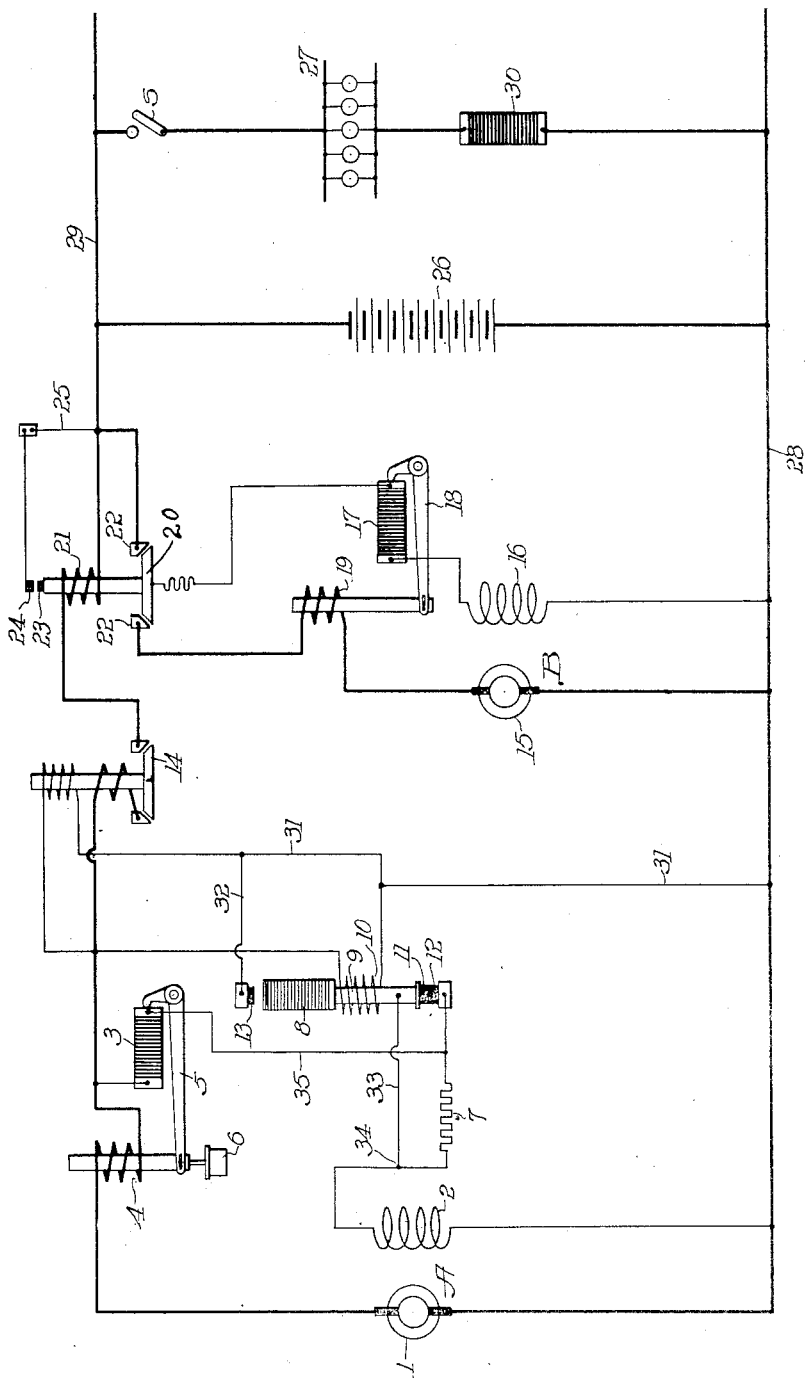

WILLIAM A. TURBAYNE, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

SYSTEM OF ELECTRICAL REGULATION.

1,301,622.     Specification of Letters Patent.     Patented Apr. 22, 1919.

Application filed September 26, 1912, Serial No. 722,502. Renewed September 13, 1918. Serial No. 253,964.

*To all whom it may concern:*

Be it known that I, WILLIAM A. TURBAYNE, a citizen of the United States, residing at Niagara Falls, in the county of Niagara and State of New York, have invented new and useful Improvements in Systems of Electrical Regulation, of which the following is a full, clear, concise, and exact description, reference being had to the accompanying drawing, forming a part of this specification.

This invention relates to improvements in systems of electrical regulation.

This regulator is adapted for use in car lighting, and more especially in systems installed on cars in which the load is apt to be excessive at times. In some systems, such as those in use on private cars which often stand several days in the station, it is desirable to employ an equipment of greater than the ordinary capacity, and this is often accomplished by employing two sets of batteries and generators connected in parallel to insure proper charging thereof.

An object of this invention is to provide a regulating system in which the generators may supply sufficient current to properly charge the batteries and supply the lamps at all times, and also which may be subject to proper regulation to prevent injuries to the batteries from overcharge, or to the lamps in case the batteries are open circuited.

Another object of the invention is to provide a regulator for a system in which a second generator may be connected in parallel with the main generator under conditions of heavy load to prevent overload on the main generator.

The drawing illustrates diagrammatically one form which this invention may assume.

Two generators A and B are arranged in parallel.

The generator A is similar to that disclosed in a co-pending application, Serial No. 722,276, filed September 25, 1912, and comprises an armature 1 and a shunt field 2. In series with the field 2 is a variable resistance 3, here shown as a compressible rheostat controlled by a coil 4, in series with the generator, through the bell crank lever 5, which is steadied by dash pot 6. A fixed resistance 7 is normally short circuited, but under certain conditions is in series with the field and the resistance 3. A second compressible rheostat 8 adapted to be connected in shunt to the field 2, rests on a plunger 9 under control of the coil 10 arranged across the system. The plunger 9 carries a movable contact 11 which coöperates with the fixed contact 12 and controls the short circuit around the resistance 7. The resistance 8 is bodily movable by the plunger 9 to complete its circuit at the fixed contact 13. An automatic switch 14 of any preferred type controls the circuit from generator 1, and cuts in or out according to the voltage of the generator.

The generator B comprises an armature 15 and a shunt field 16 regulated by means of a variable resistance in series therewith, as by the compressible rheostat 17, controlled through the bell crank lever 18 by a coil 19 in series with the generator B. An automatic switch 20 is operated by a single coil 21 in series with generator A, and will operate upon sufficient increase in load to connect generator B through contacts 22 to the line, and to complete the circuit for field winding 16 through contacts 22 and through the parallel path provided by contacts 23, 24, and conductor 25. The contacts 23 and 24 are preferably arranged to close slightly before the contacts 22. By thus energizing the field 16 before closing the circuit to the armature 15, the initial rush of current through the armature as the switch closes is minimized. Batteries 26 and lamps or other translating devices 27 are connected in multiple across the main conductors 28, 29. A suitable switch *s* and a regulator diagrammatically illustrated at 30 may control the lamp circuit, if desired.

Starting with the generators at rest, any lamp load will be supplied by the batteries in the usual manner. The automatic switches will be opened and coils 4 and 19 consequently deënergized, thereby reducing the resistance of rheostats 3 and 17 to a minimum. The resistance 7 will be short circuited and the circuit of rheostat 8 broken at contact 13. As the generators begin to operate, generator A, whose field is connected in, will pick up and when the generator voltage is sufficiently high automatic switch 14 will close, connecting generator A to the battery and lamps. Coil 4 will operate through resistance 3 to control the output of this generator and tend to cause the same to provide a constant current, regardless of the back E. M. F. of the battery, conditions of load or generator speed. Upon a predetermined condition being reached, which represents substantially the voltage above which it is not desirable to charge the batteries, coil 10 will become sufficiently energized to open the short circuit around resistance 7, thus placing it in series with the field winding and at the same time will close a parallel circuit around the field from conductor 28 through conductors 31 and 32, contact 13, rheostat 8 and conductor 33, to the point 34, where it joins the field circuit through resistance 7, conductor 35 and rheostat 3 to conductor 29. The effect of resistance 7 and the circuit in parallel to the field winding is sufficient to reduce the battery charging current substantially to zero and to cause the battery to float across the line. This permits resistance 3 to again return to its minimum value, and from this point generator A is regulated for constant potential by means of coil 10, which decreases the resistance of rheostat 8 as the speed of the generator rises, thus diverting more current from the field winding. Should the batteries become depleted, or from any other cause should the load be heavy, current in the coil 21 will be sufficient to close switch 20, thus connecting generator B in parallel with generator A and closing the field circuit 16. The generator B would then supply its proportion of the load, and would be properly regulated for constant current through the action of the series coil 19 and the resistance 17. It will thus be seen that whenever the battery and lamps provide a load sufficient to overload generator A, if acting alone, the switch 20 will operate, cutting in generator B and thereafter permitting the two generators to operate in parallel to supply constant current. Upon full charge of the battery, however, under ordinary conditions, generator B would be cut out, due to the decrease in current output from generator A. If, however, at this time the lamp load is sufficiently heavy, generator B may still continue to operate, supplying current up to the limit set by its regulator, and the generator A supplying the remainder of the load. There is thus provided a system in which the generators may be operated in parallel and still maintain the characteristics of the combined current and voltage regulation, which has in some instances been found desirable.

What I claim as new and desire to secure by Letters Patent of the United States is:

1. In a car lighting system, the combination of two independent generators connected in parallel, storage batteries charged thereby, and means limiting the output of the generators to cause the batteries to float at full charge.

2. In combination, a generator, a storage battery to be charged thereby, a second generator adapted to be connected in parallel to said first generator under predetermined conditions, and means responsive to the battery voltage for decreasing the output of the first generator and causing disconnection of the second generator when said battery voltage has risen a predetermined amount.

3. In a car lighting system, a generator, regulating means therefor adapted under predetermined conditions to maintain the generator at constant potential, and a second generator adapted to be connected in parallel, and regulating means therefor operating to cause its generator to deliver a constant current.

4. In a car lighting system, a generator, combined current and voltage operated regulating means therefor, a second generator, and means depending on the load on the first generator for connecting the second generator in parallel to the first.

5. In a car lighting system, a generator, regulating means therefor, said means operating under predetermined conditions to maintain said generator at constant potential, a second generator, and means controlled by the current output of the first generator to connect the second generator in parallel therewith.

6. In a car lighting system, a generator, a load circuit, a second generator, said generator having a shunt field winding and means depending upon the current output of the first generator for completing the circuit of the second generator, said means also controlling the shunt field circuit of the second generator.

7. In combination, a generator, a coil in series therewith, a second generator having a shunt field winding, and means controlled by said series coil for connecting said second generator in parallel with the first and simultaneously completing the shunt field circuit of said second generator.

8. In a car lighting system, a generator voltage operated regulating means therefor, a second generator, and means depending on the current output of the first generator for connecting the second generator in parallel to the first.

9. In a car lighting system, two independent variable speed generators connected in parallel, and independent regulating means for said generators, one of said regulating means causing its generators to deliver constant voltage under predetermined conditions.

In witness whereof, I have hereunto subscribed my name in the presence of two witnesses.

WILLIAM A. TURBAYNE.

Witnesses:
T. J. CALLAHAN,
F. G. SWANNIE.